3,072,293
APPARATUS FOR CONTROLLING THE PRODUCTION OF CHIPBOARDS
Ernst Greten, Springe, near Hannover, Germany, assignor to Bahre Metallwerk Kommanditgesellschaft, Springe, near Hannover, Germany, a company of Germany
Filed Apr. 29, 1960, Ser. No. 25,725
Claims priority, application Germany May 2, 1959
4 Claims. (Cl. 222—55)

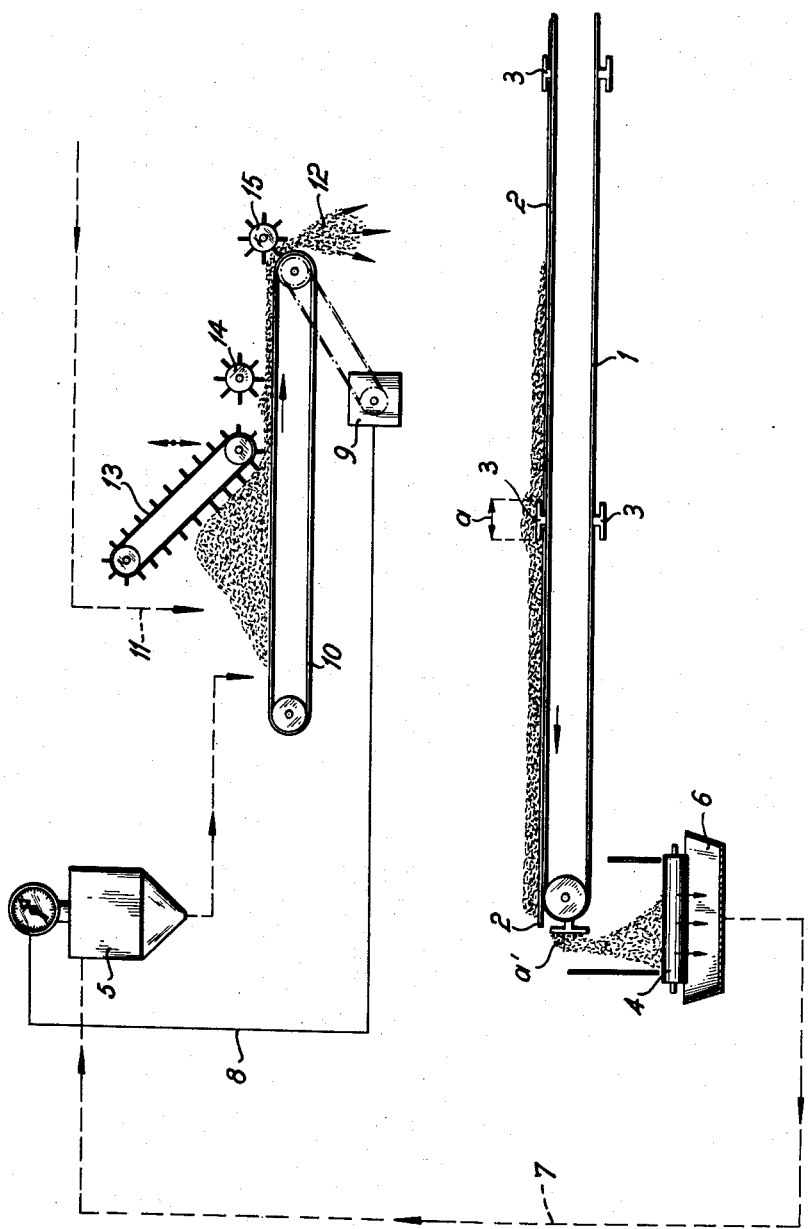

This invention relates to an apparatus for controlling the supply of chip material to the forming station of a chip board plant and apparatus for carrying out the method.

The problem of obtaining a constant specific weight of constant chip mat formed in a chip board plant had been solved by controlling the speed of operation of the feeding arrangement of the forming station according to the measurement of the specific weight of the mat. To determine the specific weight, each section of the mat has been weighed at the control point with its support, formed of sheet metal, before it has been inserted into the chip board press. This method of working is relatively complicated. Furthermore its accuracy is not sufficient; together with this, in weighing at any given time, the factor of a slow wearing away of the underlying support enters into it. The consequence of variations in the theoretical value of the specific weight is temporarily substantially delayed.

The present invention provides a method of controlling the supply of chip material at the forming station of a chip board plant which comprises dividing out chip material from a constructed chip mat between sections corresponding in length and breadth to the capacity of a chip board press, determining the specific weight of the divided-out material and controlling said supply in accordance with the measurement of said specific weight.

The present invention also provides, in a chip board plant, apparatus comprising a conveyor on which a mat is formed, means for feeding chip material to said conveyor, means for separating out a transverse strip from said mat between sections of a length suitable for pressing, a device for determining the specific weight of the chip material of said strip, means for conveying said strip to said weighing device and means for controlling said feeding means in accordance with the measurement of said specific weight.

In the drawing is shown diagrammatically an arrangement for the production of chip boards in accordance with the invention.

On an endless conveyor belt, metal sheets 2 are transported whose capacity correspond to that of a chip board press. During the uniform movement of the conveyor belt chips are likewise strewn uniformly. This strewing can be carried out in such a way that the lowermost and the uppermost layers of the resulting mat consist of fine chips whilst the intermediate part of the mat contains essentially only larger chips. Between each two sheets 2 an auxiliary sheet 3 is attached to the belt and overlaps the edges of the sheets 2. In the width of the auxiliary sheet 3 a double cut is made at a chosen time according to the construction of the mat. The metal sheets 2 may be removed from the conveyor belt by any suitable means. The strip width $a$ so formed is first of all removed from the apparatus, as is shown at $a'$. The removed strip $a$ is put on a transversely moving conveyor belt 4 from which it is put into a weighing device 5. In the drawing this is indicated by the trough 6 and the line 7. The weighing device 5 determines the specific weight of the mat material. The measuring mechanism of this weighing device 5 is electrically coupled through the circuit 8 with a control mechanism 9 which determines the working speed of the feeding arrangement by controlling the motor which drives an endless conveyor belt 10 to which are supplied chips provided at 11 with a binding agent. After passing through the weighing device, the removed mat material is returned to the belt 10, as indicated by a continuation of the line 7. An endless scraper 13 and scraper rolls 14, 15 operate to even out the chip material which is supplied at 12 to the forming station.

If the measuring mechanism of the weighing device determines that the specific weight of the previously strewn mat material is too high, a reduction of the speed of the conveyor belt is effected. Accordingly the quantity of chips leaving the forming station on the conveyor belt in unit time is reduced, so that with uniform speed of the conveyor belt 1, the thickness of the layer of strewn chip material becomes less. The opposite procedure takes place if the weighing device 5 determines that the specific weight of mat material is too low.

I claim:
1. Apparatus for forming a mat of chips comprising a conveyor, means for feeding chips to the conveyor to form a mat thereon, said conveyor having means for separating from the mat a portion of the mat, a device responsive to the specific weight of said portion of the mat, means for conveying said portion to the device and means for controlling said feeding means in accordance with the response of said device to said specific weight whereby the rate of feeding chips to the conveyor is increased in response to a portion of low specific weight and decreased in response to a portion of high specific weight.

2. Apparatus for forming a mat of chips comprising a conveyor, means for feeding chips to the conveyor to form a mat thereon, said feeding means including an endless belt in position for distributing chips on the conveyor, a variable speed motor and a driving connection between the motor and the belt, said conveyor having means for separating from the mat a portion of the mat, a device responsive to the specific weight of said portion of the mat, means for conveying said portion to the device and means for controlling said motor in accordance with the response of said device to said specific weight whereby the speed of the belt is increased in response to a portion of low specific weight and decreased in response to a portion of high specific weight.

3. Apparatus for forming a mat of chips comprising a pair of pulleys, an endless belt conveyor suspended between the pulleys, means for feeding chips to the conveyor to form a mat thereon, said conveyor having a plurality of auxiliary members secured thereon at spaced intervals whereby the mat is ruptured to separate a portion therefrom as one of the members travels over one of the pulleys, a device responsive to the specific weight of said portion of the mat, means for conveying said portion to the device and means for controlling said feeding means in accordance with the response of said device to said specific weight whereby the rate of feeding chips to the conveyor is increased in response to a portion of low specific weight and decreased in response to a portion of high specific weight.

4. Apparatus for forming a mat of chips comprising a pair of pulleys, an endless belt conveyor suspended between the pulleys, a plurality of press sheets on the conveyor, said conveyor having a plurality of auxiliary members secured to the conveyor between the press sheets, means for feeding chips to the conveyor to form a mat on the sheets and members, said members extending in overlapping relation with the adjacent edges of the press sheets, whereby the mat is ruptured to separate a portion therefrom as one of the members travels over one of the pulleys, a device responsive to the specific weight of said portion of the mat, means for conveying said portion to the device and means for controlling said feeding means in accordance with the response of said device to said specific weight whereby the rate of feeding chips to the conveyor is increased in response to a portion below specific weight and decreased in response to a portion of high specific weight.

References Cited in the file of this patent

UNITED STATES PATENTS

| | | |
|---|---|---|
| 2,753,099 | Jenner et al. | July 3, 1956 |
| 2,778,387 | Diehl | Jan. 22, 1957 |
| 2,851,063 | Leinhart | Sept. 9, 1958 |
| 2,886,210 | Cooper et al. | May 12, 1959 |
| 2,900,109 | Hoopes et al. | Aug. 18, 1959 |
| 2,925,835 | Mojonnier et al. | Feb. 23, 1960 |
| 2,953,460 | Baker | Sept. 20, 1960 |
| 2,993,625 | Esval | July 25, 1961 |

FOREIGN PATENTS

| | | |
|---|---|---|
| 321,358 | Switzerland | June 15, 1957 |
| 413,602 | Germany | May 21, 1925 |